United States Patent Office.

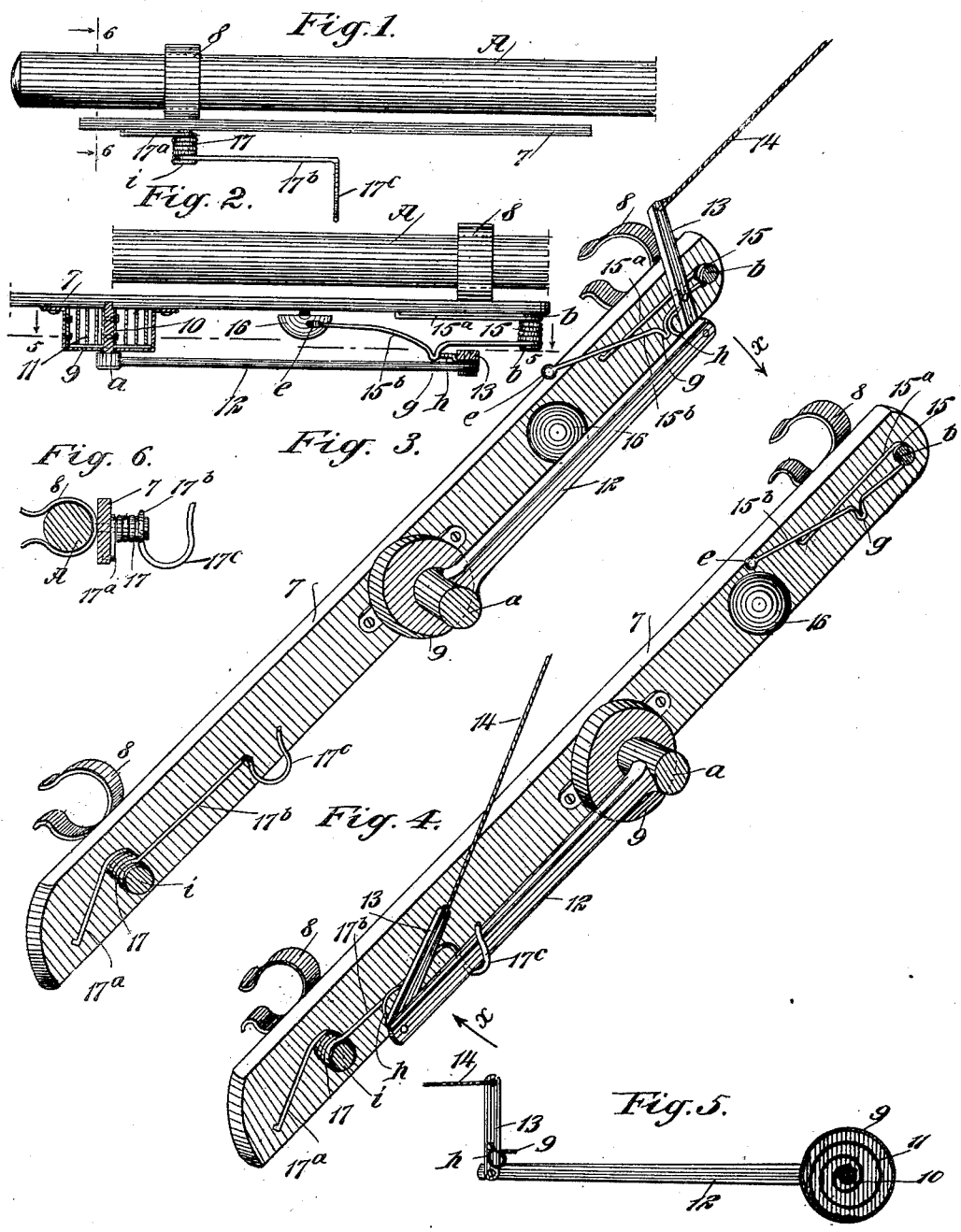

WILLIAM WESLEY DWIGANS, OF ARKADELPHIA, ARKANSAS.

FISHING DEVICE.

SPECIFICATION forming part of Letters Patent No. 667,932, dated February 12, 1901.

Application filed September 11, 1900. Serial No. 29,670. (No model.)

*To all whom it may concern:*

Be it known that I, WILLIAM WESLEY DWIGANS, a citizen of the United States, and a resident of Arkadelphia, in the county of Clark and State of Arkansas, have invented a new and Improved Fishing Device, of which the following is a full, clear, and exact description.

This invention relates to a novel attachment for a fishing rod and line which insures the hooking of a fish that takes the baited hook in its mouth and simultaneously with the pull of the fish on the line sounds an alarm to warn the fisherman to complete the capture of the fish.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a plan view of the rear end portion of the improvement mounted upon a corresponding portion of a fishing-rod. Fig. 2 is a plan view of the forward portion of the novel device held upon a portion of a fishing-rod. Fig. 3 is a perspective view of the complete device having parts adjusted for service. Fig. 4 is a perspective view showing the relative positions of parts after the line has been pulled upon by a fish. Fig. 5 is a longitudinal sectional view of details taken substantially upon the line 5 5 in Fig. 2, and Fig. 6 is a transverse sectional view substantially on the line 6 6 in Fig. 1.

In the drawings, which show the device and its application upon a fishing-rod, 7 indicates an elongated bracket-plate whereon working parts are mounted in positions that adapt them for efficient service. Upon one side of the bracket-plate 7 a plurality of spring clip-bands 8 are secured. Preferably two of these similar clip-bands are employed, and said bands are fixed, respectively, near opposite ends of the bracket-plate, as shown in Figs. 3 and 4. The clip-bands 8 are in the form of open rings, which being resilient afford convenient means for removably securing the bracket-plate and the parts it supports upon a fishing pole or rod A—near the butt-end of said pole or rod.

At a suitable point intermediate of the ends of the bracket-plate a spring box or case 9 is detachably secured, and at or near the center of the box 9 a perforation is formed in its front wall for the reception of the spindle 10, which at its inner end is journaled in the bracket-plate 7, as shown in Fig. 2, and a suitable spring 11 is mounted on the spindle, having one end secured thereto and the other end fixed to the interior of the case or box 9, as shown in Figs. 2 and 5. The outer end of the spindle 10 is engaged by the hub end $a$ of a lever 12, which is thus held in a plane parallel with the bracket-plate 7 and suitably spaced therefrom.

On the free end of the lever 12 an arm 13 is pivoted, said arm being held in contact with the inner face of the lever, and a line 14 is secured by one end upon the outer end of the arm, the fragmentary portion of the line shown in Figs. 3 and 4 being in the practical construction of the attachment extended to a proper length for use.

On a stud $b$ that projects from the outer face of the bracket-plate 7 a spring-coil 15 is held, said spring-coil being formed intermediately of the ends of a metal rod having one member $15^a$ thereof extended between the arm 13 and bracket-plate 7 toward the spring-box 9 and terminating in a laterally-bent stud that is driven into the plate, or the arm may be otherwise secured to the plate. The other member $15^b$ of the bent rod is somewhat longer than the one which is secured to the plate 7 and also extends toward the spring-box 9 and terminates at its free extremity in a bell-clapper $e$. A bell 16 in gong form is held on a stud laterally positioned on the outer side face of the bracket-plate 7 below the clapper to permit the latter on vibration to strike the bell.

At a point which will locate it slightly rearward of the arm 13 when the latter is upright on the lever 12 and the lever is extended forwardly, as shown in Fig. 3, a trigger $g$ is formed or secured on the spring-actuated member $15^b$. The trigger $g$ projects outwardly, or, in other words, away from the bracket-plate 7, and on the arm 13 a detent projection h is formed or secured, this projection being adapted for engagement with the forward side of the trigger g when the lever 12 and arm 13 are disposed as shown in Figs. 2 and 3.

On the outer face of the bracket-plate 7, near the rear end of the same, or the end that is nearest the butt of a fishing-rod A when the complete device is mounted on said rod, a spring-coil 17 is loosely secured by a stud i, fixed in the bracket-plate. From the coil 17 an arm 17ª extends rearwardly along the face of the bracket-plate 7 and at the rear extremity is secured upon said bracket-plate. Another arm 17ᵇ projects forwardly of a suitable length from the outer end of the spring-coil 17 and is outwardly bent near the forward end into the form of a depending hook 17ᶜ, so positioned as to lie in the path of the lever 12 and support it when said lever is adjusted as shown in Fig. 4.

Assuming that the device in complete form has been mounted upon a fishing-rod A so as to dispose the bracket-plate 7 at one side of and near the butt-end of said rod, and, furthermore, that the fishing-line 14 of full length for effective service is provided at its free end with a suitable fish-hook properly baited, the operation is as follows: The fisherman first turns the lever 12 and arm 13 in the direction of the arrow x in Figs. 3 and 4, so as to wind the spring 11 upon the spindle 10 sufficiently to give proper tensional force to the spring, and when this is attained and the lever 12 is disposed forwardly in a horizontal position the arm 13 is rocked on its pivot so as to render it upright, and thus bring the detent h into enforced engagement with the trigger g and below it, as best shown in Fig. 5. It will be seen that the stress of the spring 11 that is transmitted to the lever 12 has a tendency to lift the arm 13, and thus cause the detent h to press upwardly on the trigger g, which will rock the bell-clapper arm 15ᵇ upwardly a suitable degree against the stress of the coiled spring 15.

When the device is arranged for service, as explained, the bell-clapper e is elevated over the bell 16, as shown in Fig. 3, and the operator may now cast the line over and into the water, so that the baited hook may attract a fish. If the bait is taken and the fish pulls upon the line 14 with sufficient force to dislodge the detent h from the trigger g, this will release the bell-clapper arm 15ᵇ, and the force of the coiled spring 15 will be exerted to throw the clapper e against the bell 16, from which it will recoil slightly, as indicated in Fig. 4. Upon release of the arm 13 and lever 12 the spring 11 will uncoil somewhat and instantly rock the lever 12 rearwardly until it is arrested by the spring-supported arm 17ᵇ, as shown in Fig. 4, the sudden jerk thus given to the fishing-line 14 serving to hook the fish fast upon the line. The alarm sounded by the bell 16 at the time of the release of the lever 12 warns the fisherman that a fish has been hooked and that proper play of the rod may be required to land the fish if it is of considerable size and corresponding strength to resist its capture.

The novel device is very simple, operates reliably, is quite small and portable, may be manufactured at low cost, and enables fish to be captured by an inexperienced fisherman.

Having described my invention, I claim as new and desire to secure by Letters Patent—

1. A fishing device, comprising a bracket-plate, clips thereon for clasping engagement with a fishing-rod, a spring-pressed lever rockable on the bracket-plate, a line on said lever, means to hold the lever set against stress of the spring but releasable by a pull on the line, and a spring-arresting device adapted to control the rocking movement of the lever.

2. A fishing device, comprising a bracket-plate, means to detachably secure said plate on a fishing-rod, a spring-holding box, and a coiled spring therein held on the bracket-plate, a pivoted lever engaged by said coiled spring for its enforced rocking movement, a pivoted arm on the free end of the lever, a line on the free end of the arm, means to hold the lever set against stress of the spring, but releasable by a pull on the line, and a spring-controlled arresting-arm for the lever.

3. A device attachable to fishing-rods, comprising an elongated bracket-plate, a spring held in a box on said bracket-plate, a lever pivoted at one end upon the box and adapted for rocking movement by said spring, a pivoted arm on the free end of the lever, a line on said arm, a bell on the bracket-plate, and a bell-striking device adapted to hold the lever rocked against the stress of its actuating-spring, but releasable by a pull on the line.

4. A device attachable to fishing-rods, comprising an elongated bracket-plate, a spring-box secured intermediate of the ends of said plate, a spindle held to rock transversely in the box, a helical spring secured by its ends on the spindle and box, a lever extending from the outer end of the spindle parallel with the bracket-plate, an arm pivoted by one end on the lever, a detent device projected from said arm, a spring-pressed bell-striker arm, a bell on the bracket-plate whereon the clapper of said arm may strike, a trigger on said arm adapted to engage the detent device and hold the lever rocked against stress of the helical spring, and a spring-pressed device for arresting the lever.

In testimony whereof I have signed my name to this specification in the presence of two subscribing witnesses.

WILLIAM WESLEY DWIGANS.

Witnesses:
W. C. MAGUIRE,
W. P. PHILLIPS.